(12) United States Patent
Qian et al.

(10) Patent No.: US 10,179,750 B2
(45) Date of Patent: Jan. 15, 2019

(54) PREPARATION METHOD OF POLYCARBOXYLATE SUPERPLASTICIZER WITH CARBON DIOXIDE

(71) Applicant: Jiangsu ARIT New Materials CO., LTD., Nanjing (CN)

(72) Inventors: Shanshan Qian, Nanjing (CN); Zhaolai Guo, Nanjing (CN); Chunyang Zheng, Nanjing (CN); Chunman Huang, Nanjing (CN); Haidong Jiang, Nanjing (CN); Gaoming Wang, Nanjing (CN); Yi Wang, Nanjing (CN); Mengting Li, Nanjing (CN); Ying Qiu, Nanjing (CN); Jiezhong Gan, Nanjing (CN)

(73) Assignee: JIANGSU ARIT NEW MATERIALS CO., LTD., Nanjing (CN)

( * ) Notice: Subject to any disclaimer, the term of this patent is extended or adjusted under 35 U.S.C. 154(b) by 0 days.

(21) Appl. No.: 15/687,560

(22) Filed: Aug. 28, 2017

(65) Prior Publication Data
US 2018/0155244 A1 Jun. 7, 2018

(30) Foreign Application Priority Data
Jul. 18, 2016 (CN) .......................... 2016 1 0569337

(51) Int. Cl.
*C04B 24/26* (2006.01)
*C08F 8/00* (2006.01)
*C04B 103/32* (2006.01)

(52) U.S. Cl.
CPC ............ *C04B 24/2647* (2013.01); *C08F 8/00* (2013.01); *C04B 2103/32* (2013.01)

(58) Field of Classification Search
CPC ................................................. C04B 24/2647
See application file for complete search history.

(56) References Cited

FOREIGN PATENT DOCUMENTS

CN 103254418 A 8/2013

OTHER PUBLICATIONS

Wang, Z.; Lu, Z.; Lu, F.; Li, H. Relationship between Structure and Performance of Polycarboxylate Superplasticizer. Key Engineering Materials. vol. 509, pp. 57-64 (Year: 2012).*

(Continued)

*Primary Examiner* — Michael M Dollinger
*Assistant Examiner* — Christina H Wales
(74) *Attorney, Agent, or Firm* — Gokalp Bayramoglu

(57) ABSTRACT

The present invention discloses a preparation method of a polycarboxylate superplasticizer with carbon dioxide, comprising the following steps: (1) preparing a polycarboxylate superplasticizer prepolymer: performing an oxidation-reduction radical polymerization of an unsaturated macromonomer, an unsaturated phenol derivative, a reducing agent, an initiator and a chain transfer agent with different proportions under a nitrogen atmosphere to obtain a novel polycarboxylate superplasticizer prepolymer with different molecular weight; adjusting the pH by adding an alkali; (2) preparing a polycarboxylate superplasticizer: performing a Koble-Schmitt reaction between the polycarboxylate superplasticizer prepolymer and a carbon dioxide for a certain time to obtain the polycarboxylate superplasticizer. The polycarboxylate superplasticizer prepared by the method of the present invention retains the advantages of the existing water-reducing admixture of the polyether monomer compounds, and the production process is simple, safe, controllable, less side effect and has a better cost effective and competitive advantage.

10 Claims, 1 Drawing Sheet

(56) References Cited

OTHER PUBLICATIONS

Zeng, F. Experimental Study of Novel Polycarboxylate-Based Superplasticizer for Concrete. Asian Journal of Chemistry. vol. 26, No. 17, pp. 5502-5504 (Year: 2014).*

* cited by examiner

PREPARATION METHOD OF POLYCARBOXYLATE SUPERPLASTICIZER WITH CARBON DIOXIDE

CROSS REFERENCE TO RELATED APPLICATIONS

This application is based upon and claims priority to Chinese Patent Application No. CN201610569337.3, filed on Jul. 18, 2016, the entire contents of which are incorporated herein by reference.

FIELD OF THE INVENTION

The present invention relates to a preparation method of a polycarboxylate superplasticizer for cement concrete, especially to a preparation method of a polycarboxylate superplasticizer with carbon dioxide.

BACKGROUND OF THE INVENTION

At present, the water-reducing admixture commonly used in commercial can be divided into naphthalene based, melamine based and sulfamate based water-reducing admixture. With a great variation on the slumps, complex production process, high energy consumption and environmental pollution, the traditional naphthalene based, melamine based and sulfamate based water-reducing admixture cannot meet the needs of the era of low-carbon economy, the concrete industry and the sustainable development. With the increasingly high requirements in the durability and strength of concrete buildings during the engineering construction and application, a low mixing amount, high water-reducing rate, non-retarding, low slumping change, low energy consumption, safety and environmental friendly polycarboxylate superplasticizer is required.

The high performance polycarboxylate superplasticizer has many characteristics: (1) in the synthesis process, the high performance polycarboxylate superplasticizer is polymerized by unsaturated monomer rather than a polycondensation synthesis as traditional superplasticizer used. Thus, there are many raw materials for this type of water-reducing admixture. (2) in the molecular structure, the molecular structure of the polycarboxylate superplasticizer is a linear comb structure, rather than a single linear structure as the traditional water reducing agent. There are various active groups polymerized in the backbone of this kind of water-reducing admixture, such as the carboxy group (—COOH), hydroxyl group (—OH), sulfonic acid group (—SO$_3$Na), etc., resulting in electrostatic repulsion effect. And the hydrophilic non-polar active groups in the side chain will result in a high steric hindrance effect. Because of its extensive source of raw materials, unique molecular structure, it has the advantages of unparalleled advantages compared to the previous two generations of water-reducing admixture. And because of formaldehyde free in the synthesis process, it is a green environmental production. Therefore, it has become a hot search and development focus in concrete research at home and abroad in recent years.

Chinese patent application CN103254418A reports a preparation method for a novel polycarboxylate superplasticizer using the polyether polyol as a raw material, comprising the following steps: (1) adding 3-30 parts of polyether polyol, 50-90 parts of mono-halogenated fatty acid or the salt thereof by weight, incubating in 65-75° C. for 1-3 hours; (2) adding 1-8 parts of catalyst by weight and raising the temperature to 80-120° C. for 2-4 hours; (3) cooling to 60-80° C., adding 10-40 parts of sulfonating agent by weight dropwise and incubating for 1-3 hours; (4) cooling to 20-60° C., adjusting the pH to 7.0-7.5 to obtain the target product. The water-reducing admixture obtain by this application has a good performance. And the preparation method thereof is simple and environmental friendly. However, the reaction temperature in step (1) of the above application is high, resulting in energy waste. Moreover, the utilizing ratio of the mother liquor of the polycarboxylate superplasticizer is relatively low and cannot be effectively utilized.

SUMMARY

The object of the present invention is to provide a novel preparation method of a polycarboxylate superplasticizer with carbon dioxide to improve the deficiencies of the prior art.

The technical scheme of the present invention is: a preparation method of a polycarboxylate superplasticizer with carbon dioxide, comprising the following steps:

step 1: preparing a polycarboxylate superplasticizer prepolymer: performing an oxidation-reduction radical polymerization of an unsaturated macromonomer, an unsaturated phenol derivative, a reducing agent, an initiator and a chain transfer agent with different proportions under a nitrogen atmosphere at a temperature of 0-50° C., obtaining a novel polycarboxylate superplasticizer prepolymer with a molecular weight of 20000-80000 g/mol after reacting for 1-3 hours; adjusting a pH of the polycarboxylate superplasticizer prepolymer to 7-8 by adding an alkali; wherein a molar ratio of the unsaturated macromonomer, unsaturated phenol derivative, reducing agent, initiator and chain transfer agent is 1:(2-6):(0.03-0.05):(0.01-0.05):(0.003-0.005).

step 2: preparing a polycarboxylate superplasticizer: performing a Koble-Schmitt reaction between the polycarboxylate superplasticizer prepolymer obtained in step 1 and a carbon dioxide for 1-3 hours at 125-150° C. under an atmospheric pressure of 0.5-1 MPa to obtain the polycarboxylate superplasticizer; wherein a molar ratio of the polycarboxylate superplasticizer prepolymer to the carbon dioxide is 1:(1.0-1.5).

Preferably, a structural formula of the unsaturated phenol derivative is:

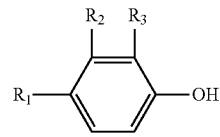

wherein in the formula, R1, R2 and R3 are respectively selected from a group consisting of H, methoxyl and C2-C5 unsaturated alkenyl group; wherein one of the R1, R2 and R3 must be a C2-C5 unsaturated alkenyl group.

More preferable, the unsaturated phenol derivative is one or more selected from a group consisting of 4-vinylphenol, 2-vinylphenol, 3-vinylphenol and 4-vinyl-2-methoxyl-phenol.

Preferable, the unsaturated macromonomer is selected from a group consisting of unsaturated polyether macromonomer and unsaturated ester macromonomer.

More preferably, the unsaturated macromonomer is one or more selected from a group consisting of acrylic polyethers, methyl acrylic polyethers, 3-methyl-3-butene-1-polyethylene glycol, 2-methyl acrylic polyethers, methoxypolyethylene glycol acrylate, methoxypolyethylene glycol methacrylate, polyethylene glycol methacrylate and polyethylene glycol acrylate; wherein the molecular weight of the unsaturated macromonomer is 300-8000 g/mol.

Preferably, the alkali is one or more selected from a group consisting of potassium hydroxide and sodium hydroxide. More preferably, the initiator is a persulfate or a peroxide. Furthermore preferably, the initiator is one or more selected from a group consisting of hydrogen peroxide, ammonium persulfate, sodium persulfate and potassium persulfate.

Preferably, the chain transfer agent is one or more selected from a group consisting of thioglycolic acid, 2-mercaptopropionic acid, mercaptoethanol, 3-mercaptopropionic acid, sodium methacrylate and dodecanethiol.

More preferably, the reducing agent in step 1 is one or more selected from a group consisting of sodium formaldehyde sulfoxylate, sodium metabisulfite, N, N-dimethylaniline, sodium bisulfite, sodium formaldehyde sulfoxylate, ferrous sulfate, N, N-diethylaniline, ferrous pyrophosphate, tetraethyleneamine and sodium ascorbate.

The preparation method of the novel polycarboxylate superplasticizer in the present invention is to firstly prepare a polycarboxylate superplasticizer prepolymer by the reaction of the unsaturated phenol derivative and unsaturated polyether macromonomer. Then the Koble-Schmitt reaction lowers the reaction difficulty effectively. The reaction is rapid, efficient, non-toxic, without pollution and simple in operation. The polycarboxylate superplasticizer prepared by the method of the present invention is a functional high performance polycarboxylate superplasticizer with high conversion rate and excellent performance.

The benefits:

1. The polycarboxylate superplasticizer prepared by the method of the present invention retains the advantages of the existing water-reducing admixture and the production process is simple, safe, controllable and has a better cost effective and competitive advantage.

2. The raw material used in the present invention is abundant, all the steps have been industrialized and the operation steps are simple, convenient and mature.

3. The polycarboxylate superplasticizer prepared by the method of the present invention contains a new type of benzene ring structure, which can adjust the HLB value. The synthetic polycarboxylate superplasticizer has an excellent adaptability to the concrete.

4. A Koble-Schmitt reaction is used in the method of the present invention, and is capable of preparing the polycarboxylate superplasticizer simply. Therefor the reaction time is greatly shortened.

5. Carbon dioxide is the prime culprit in global warming. The use of carbon dioxide as raw material to synthesize polycarboxylate superplasticizer can not only save costs, but also reduce "greenhouse effect".

DETAILED DESCRIPTION

Figure 1:
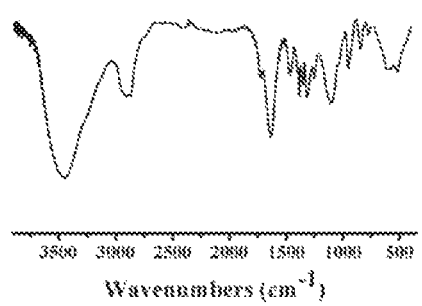
FIG. 1 IR spectrum of the polycarboxylic superplasticizer obtained in Embodiment 2 (sample 2).

The present invention will be described in detail with reference to the following embodiments.

Embodiment 1 step 1: preparing a polycarboxylate superplasticizer prepolymer: performing an oxidation-reduction radical polymerization of 10 mol acrylic polyethers (1000 g/mol), 20 mol 4-vinylphenol, 0.3 mol sodium bisulfite, 0.4 mol hydrogen peroxide and 0.3 mol thioglycolic acid under a nitrogen atmosphere at a temperature of 30° C., obtaining a novel polycarboxylate superplasticizer prepolymer with a molecular weight of 20000 g/mol after reacting for 1 hour; adjusting a pH of the Polycarboxylate superplasticizer prepolymer to 7 by adding a potassium hydroxide.

step 2: preparing a polycarboxylate superplasticizer: performing a Koble-Schmitt reaction between 10 mol of the polycarboxylate superplasticizer prepolymer and 10 mol carbon dioxide for 1.5 hours at 125° C. under an atmospheric pressure of 1 MPa to obtain a polycarboxylate superplasticizer.

Embodiment 2 step 1: preparing a polycarboxylate superplasticizer prepolymer: performing an oxidation-reduction radical polymerization of 10 mol methyl acrylic polyethers (1000 g/mol), 30 mol 2-vinylphenol, 0.35 mol sodium formaldehyde sulfoxylate, 0.3 mol ammonium persulfate and 0.035 mol 2-mercaptopropionic acid under a nitrogen atmosphere at a temperature of 40° C., obtaining a novel polycarboxylate superplasticizer prepolymer with a molecular weight of 30000 g/mol after reacting for 1.5 hours; adjusting a pH of the polycarboxylate superplasticizer prepolymer to 8 by adding a sodium hydroxide.

step 2: preparing a polycarboxylate superplasticizer: performing a Koble-Schmitt reaction between 10 mol of the polycarboxylate superplasticizer prepolymer and 11 mol carbon dioxide for 1 hour at 130° C. under an atmospheric pressure of 0.9 MPa to obtain a polycarboxylate superplasticizer.

Embodiment 3 step 1: preparing a polycarboxylate superplasticizer prepolymer: performing an oxidation-reduction radical polymerization of 10 mol 3-methyl-3-butene-1-polyethylene glyco, 40 mol 3-vinylphenol, 0.4 mol sodium metabisulfite, 0.5 mol sodium persulfate and 0.04 mol mercaptoethanol under a nitrogen atmosphere at a temperature of 30° C., obtaining a novel polycarboxylate superplasticizer prepolymer with a molecular weight of 40000 g/mol after reacting for 2 hours; adjusting a pH of the polycarboxylate superplasticizer prepolymer to 7 by adding a potassium hydroxide.

step 2: preparing a polycarboxylate superplasticizer: performing a Koble-Schmitt reaction between 10 mol of the polycarboxylate superplasticizer prepolymer and 12 mol carbon dioxide for 3 hours at 135° C. under an atmospheric pressure of 0.8 MPa to obtain a polycarboxylate superplasticizer.

Embodiment 4 step 1: preparing a polycarboxylate superplasticizer prepolymer: performing an oxidation-reduction radical polymerization of 10 mol methoxypolyethylene glycol methacrylate, 50 mol 4-vinyl-2-methoxyl-phenol, 0.45 mol N,N-dimethylaniline, 0.4 mol potassium persulfate and 0.045 mol 3-mercaptopropionic acid under a nitrogen atmosphere at a temperature of 20° C., obtaining a novel polycarboxylate superplasticizer prepolymer with a molecular weight of 70000 g/mol after reacting for 3 hours; adjusting a pH of the polycarboxylate superplasticizer prepolymer to 8 by adding a potassium hydroxide.

step 2: preparing a novel polycarboxylate superplasticizer: performing a Koble-Schmitt reaction between 10 mol of the polycarboxylate superplasticizer prepolymer and 13 mol carbon dioxide for 2.5 hours at 140° C. under an atmospheric pressure of 0.5 MPa to obtain a polycarboxylate superplasticizer.

Embodiment 5 step 1: preparing a polycarboxylate superplasticizer prepolymer: performing an oxidation-reduction radical polymerization of 10 mol methoxypolyethylene glycol acrylate, 60 mol 3-vinylphenol, 0.5 mol sodium bisulfite, 0.2 mol hydrogen peroxide and 0.05 mol sodium methacrylate under a nitrogen atmosphere at a temperature of 10° C., obtaining a novel polycarboxylate superplasticizer prepolymer with a molecular weight of 50000 g/mol after reacting for 1 hour; adjusting a pH of the polycarboxylate superplasticizer prepolymer to 7 by adding a potassium hydroxide.

step 2: preparing a novel polycarboxylate superplasticizer: performing a Koble-Schmitt reaction between 10 mol of the polycarboxylate superplasticizer prepolymer and 14 mol carbon dioxide for 2 hours at 145° C. under an atmospheric pressure of 0.7 MPa to obtain a polycarboxylate superplasticizer.

Embodiment 6 step 1: preparing a polycarboxylate superplasticizer prepolymer: performing an oxidation-reduction radical polymerization of 10 mol polyethylene glycol acrylate, 45 mol 4-vinyl-2-methoxyl-phenol, 0.3 mol sodium formaldehyde sulfoxylate, 0.3 mol ammonium persulfate and 0.03 mol dodecanethiol under a nitrogen atmosphere at a temperature of 50° C., obtaining a novel polycarboxylate superplasticizer prepolymer with a molecular weight of 50000 g/mol after reacting for 2.5 hours; adjusting a pH of the polycarboxylate superplasticizer prepolymer to 8 by adding a sodium hydroxide.

step 2: preparing a novel polycarboxylate superplasticizer: performing a Koble-Schmitt reaction between 10 mol of the polycarboxylate superplasticizer prepolymer and 15 mol carbon dioxide for 1.5 hours at 150° C. under an atmospheric pressure of 0.6 MPa to obtain a polycarboxylate superplasticizer.

Embodiment 7 step 1: preparing a polycarboxylate superplasticizer prepolymer: performing an oxidation-reduction radical polymerization of 10 mol polyethylene glycol methacrylate, 35 mol 2-vinylphenol, 0.5 mol sodium ascorbate, 0.1 mol potassium persulfate and 0.04 mol 3-mercaptopropionic acid under a nitrogen atmosphere at a temperature of 0° C., obtaining a novel polycarboxylate superplasticizer prepolymer with a molecular weight of 80000 g/mol after reacting for 3 hours; adjusting a pH of the polycarboxylate superplasticizer prepolymer to 7 by adding a potassium hydroxide.

step 2: preparing a novel polycarboxylate superplasticizer: performing a Koble-Schmitt reaction between 10 mol of the polycarboxylate superplasticizer prepolymer and 10 mol carbon dioxide for 1 hour at 125° C. under an atmospheric pressure of 0.5 MPa to obtain a polycarboxylate superplasticizer.

Performance Testing

1. Paste Fluidity Test:

The samples obtained in Embodiments 1-7 are subjected to a paste fluidity test with reference to GB8077-2000 "Homogenization Test Method for Concrete Admixtures". The W/C is 0.29. The dosage of the admixture is 0.15% of the cement by weight. There is almost no 5 h loss.

TABLE 1

The paste fluidity of different samples and the time-loss

| Sample | Dosage | Paste Fluidity/mm | | |
|---|---|---|---|---|
| | | 0 h | 0.5 h | 1 h |
| 1 | 0.15% | 224 | 207 | 180 |
| 2 | | 225 | 205 | 184 |
| 3 | | 234 | 210 | 194 |
| 4 | | 223 | 206 | 181 |
| 5 | | 233 | 205 | 186 |
| 6 | | 227 | 209 | 179 |
| 7 | | 232 | 216 | 192 |

2. The Concrete Performance Test:

The samples obtained in Embodiments 1-7 are subjected to a slump loss and concrete strength test with reference to GB8076-2008 "Concrete Admixtures". When the dosage of the admixture is 1.8 wt % (compared to the cement used), the compressive strength increased by more than 85% in 3 days, the compressive strength increased by more than 70% in 7 days, and the compressive strength increased by more than 75% in 28 days.

TABLE 2

The concrete collapsibility and mechanical properties of different samples

| Sample | Dosage | Slump (mm)/ Slump Flow(mm) | | Mechanical Properties/ MPa | | |
|---|---|---|---|---|---|---|
| | | 0 h | 1 h | 3 d | 7 d | 28 d |
| 1 | 1.8% | 220/505 | 185/475 | 22.7 | 34.7 | 38.8 |
| 2 | | 215/530 | 195/495 | 24.8 | 34.7 | 38.5 |
| 3 | | 200/520 | 185/485 | 25.6 | 33.5 | 39.3 |
| 4 | | 210/525 | 185/485 | 24.8 | 34.5 | 38.7 |
| 5 | | 220/535 | 195/490 | 24.8 | 33.8 | 37.9 |
| 6 | | 215/530 | 200/505 | 25.7 | 33.6 | 39.7 |
| 7 | | 220/530 | 195/505 | 23.5 | 34.7 | 38.8 |

3. Infrared Spectroscopy Analysis of the Polycarboxylate Superplasticizer Obtained in Embodiment 2 (Sample 2).

Dry the polycarboxylate superplasticizer obtained in Embodiment 2 (sample 2) to a constant weight and mix the sample with KBr powder to make tablets. Place the tablets under VERTEX70-type Fourier infrared spectrometer of German Bruker to make a record of infrared spectrum.

From IR spectrum in FIG. 1, in the IR spectrum of the synthesized polycarboxylic superplasticizer obtained in Embodiment 2 (sample 2), the stretching vibration peaks of C—H on benzene ring are located in 3024 $cm^{-1}$, 3060 $cm^{-1}$, 3082 cm$^{-1}$. Saturated stretching vibration peaks of CH and CH$_2$ are located in 2092 cm$^{-1}$, 2849 cm$^{-1}$. The skeleton vibration peak of benzene ring is located in 1600 cm$^{-1}$, the in-plane bending vibration peak of C—H on benzene ring is located in 1494 cm$^{-1}$, and the absorption peak of C—O—C ether bond of the long chain of polyether side chain polyoxyethylene is located in 1093 cm$^{-1}$ and its stretching peak is located in 2866 cm$^{-1}$ and the C—H vibration peak in the methyl group and the main chain methyl group in the side chain phosphate of the structure located in 1380 cm$^{-1}$.

4. H Nuclear Magnetic Resonance (H NMR) Analysis of the Polycarboxylate Superplasticizer Obtained in Embodiment 2 (Sample 2).

Dry the polycarboxylate superplasticizer obtained in Embodiment 2 (sample 2) to a constant weight and dissolve into heavy water. After totally dissolved, pour the solution into a nuclear magnetic tube and put it under ARX-400-type nuclear magnetic resonance spectrometer of German Bruker to make a record of $^1$HNMR spectrum.

Figure 2:
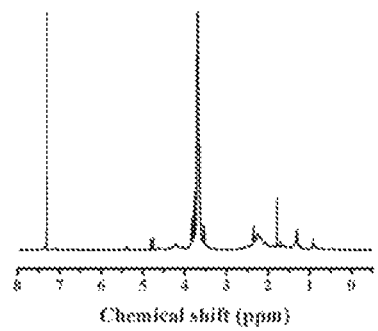
FIG. 2 $^1$H Nuclear magnetic resonance spectroscopy of polycarboxylic superplasticizer obtained in Embodiment 2 (sample 2).

From FIG. 2, chemical displacement peak value around 1.2 ppm is a hydrogen from the methyl group on the backbone, chemical displacement peak value ranging from 1.5 to 2.0 ppm is a hydrogen from the methylene on the backbone chain, and chemical displacement peak value ranging from 2.0 to 2.5 ppm is a hydrogen from the methylene on the backbone. The peak also proved that all kinds of monomers have been synthesized into the macromolecular structure of superplasticizer (sample 2). The highest peak around 3.6 ppm is the hydrogen of the long-chain methylene group in the polyoxyethylene chain, and therefore it contains a large number of methylene groups in its structure. The peak around 7.1 ppm is a hydrogen on the benzene ring and the hydrogen chemical displacement peak value of the methylene group attached to the benzene ring is around 5.4 ppm.

We claim:

1. A method for preparing a polycarboxylate superplasticizer with carbon dioxide, comprising the following steps:

step 1: preparing a polycarboxylate superplasticizer prepolymer: performing an oxidation-reduction radical polymerization of an unsaturated macromonomer, an unsaturated phenol derivative, a reducing agent, an initiator and a chain transfer agent with different proportions under a nitrogen atmosphere at a temperature of 0-50° C., obtaining a novel polycarboxylate superplasticizer prepolymer with a molecular weight of 20000-80000 g/mol after reacting for 1-3 hours; adjusting a pH of the polycarboxylate superplasticizer prepolymer to 7-8 by adding an alkali; wherein a molar ratio of the unsaturated macromonomer, unsaturated phenol derivative, reducing agent, initiator and chain transfer agent is 1:(2-6):(0.03-0.05):(0.01-0.05): (0.003-0.005);

step 2: preparing a polycarboxylate superplasticizer: performing a Koble-Schmitt reaction between the polycarboxylate superplasticizer prepolymer obtained in step 1 and a carbon dioxide for 1-3 hours at 125-150° C. under an atmospheric pressure of 0.5-1 MPa to obtain the polycarboxylate superplasticizer; wherein a molar ratio of the polycarboxylate superplasticizer prepolymer to the carbon dioxide is 1:(1.0-1.5).

2. The method according to claim 1, wherein a structural formula of the unsaturated phenol derivative is:

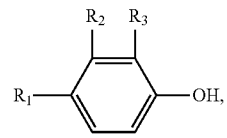

wherein in the formula, R1, R2 and R3 are respectively selected from a group consisting of H, methoxyl and C2-C5 unsaturated alkenyl group; wherein one of the R1, R2 and R3 is a C2-C5 unsaturated alkenyl group.

3. The method according to claim 1, wherein the unsaturated phenol derivative in step 1 is one or more selected from a group consisting of 4-vinylphenol, 2-vinylphenol, 3-vinylphenol and 4-vinyl-2-methoxyl-phenol.

4. The method according to claim 1, wherein the unsaturated macromonomer in step 1 is selected from a group consisting of unsaturated polyether macromonomer and unsaturated ester macromonomer.

5. The method according to claim 1, wherein the unsaturated macromonomer in step 1 is one or more selected from a group consisting of acrylic polyethers, methyl acrylic polyethers, 3-methyl-3-butene-1-polyethylene glycol, 2-methyl acrylic polyethers, methoxypolyethylene glycol acrylate, methoxypolyethylene glycol monomethyl ether acrylate, methoxypolyethylene glycol methacrylate, polyethylene glycol methacrylate and polyethylene glycol acrylate; wherein the molecular weight of the unsaturated macromonomer is 300-8000 g/mol.

6. The method according to claim 1, wherein the alkali in step 1 is one or more selected from a group consisting of potassium hydroxide and sodium hydroxide.

7. The method according to claim 1, wherein the initiator in step 1 is selected from a group consisting of persulfate and peroxide.

8. The method according to claim 1, wherein the initiator in step 1 is one or more selected from a group consisting of hydrogen peroxide, ammonium persulfate, sodium persulfate and potassium persulfate.

9. The method according to claim 1, wherein the chain transfer agent in step 1 is one or more selected from a group consisting of thioglycolic acid, 2-mercaptopropionic acid, mercaptoethanol, 3-mercaptopropionic acid, sodium methacrylate and dodecanethiol.

10. The method according to claim 1, wherein the reducing agent in step 1 is one or more selected from a group consisting of sodium formaldehyde sulfoxylate, sodium metabisulfite, N, N-dimethylaniline, sodium bisulfite, sodium formaldehyde sulfoxylate, ferrous sulfate, N, N-diethylaniline, ferrous pyrophosphate, tetraethyleneamine and sodium ascorbate.

* * * * *